United States Patent [19]

Sato

[11] Patent Number: 5,479,158
[45] Date of Patent: Dec. 26, 1995

[54] PRIORITY SELECTION CIRCUIT WITH INCREASING PRIORITY LEVELS FOR NON-SELECTED REQUESTED DEVICES

[75] Inventor: Fumiki Sato, Hyogo, Japan

[73] Assignee: Mitsubishi Denki Kabushiki Kaisha, Tokyo, Japan

[21] Appl. No.: 66,457

[22] Filed: May 24, 1993

[30] Foreign Application Priority Data

Jun. 5, 1992 [JP] Japan ................... 4-171591

[51] Int. Cl.⁶ ............. H04Q 9/00; H04L 12/00
[52] U.S. Cl. .......... 340/825.5; 340/825.51; 340/825.07
[58] Field of Search ............. 340/825.07, 825.5, 340/825.51

[56] References Cited

U.S. PATENT DOCUMENTS

| | | | |
|---|---|---|---|
| 4,232,294 | 11/1980 | Burke et al. ............... | 340/147 |
| 4,339,808 | 7/1982 | North ....................... | 340/825.5 |
| 4,423,384 | 12/1983 | Debock ..................... | 340/825.51 |
| 4,612,542 | 9/1986 | Pantry et al. ............... | 340/825.5 |
| 4,663,756 | 5/1987 | Retterath .................. | 340/825.5 |
| 4,742,348 | 5/1988 | Wagner ..................... | 340/825.5 |
| 4,924,220 | 5/1990 | Mihara et al. .............. | 340/825.5 |
| 4,962,379 | 10/1990 | Yasuda et al. .............. | 340/825.5 |
| 5,160,923 | 11/1992 | Jugawara et al. ............ | 340/825.5 |
| 5,179,705 | 1/1993 | Kent ........................ | 340/825.5 |

FOREIGN PATENT DOCUMENTS

| | | | |
|---|---|---|---|
| 0236239 | 10/1986 | Japan ........................ | 340/825.5 |
| 3-180934 | 6/1991 | Japan ........................ | G06F 9/46 |

*Primary Examiner*—Donald J. Yusko
*Assistant Examiner*—William H. Wilson, Jr.
*Attorney, Agent, or Firm*—Townsend and Townsend and Crew

[57] ABSTRACT

A priority selection circuit includes the initial value registers for re-setting the initial values of priority levels in priority level registers of one of the circuits $1a$ to $1d$ in which the service requests are accepted and the addition sections for adding +1 to the contents of the priority level registers of the circuits in which the service requests are not accepted. Thus, the priority level of the device in which the service request is made but not selected can be increased by the addition so as to eliminate the state that the service request is not accepted.

12 Claims, 9 Drawing Sheets

PRIORITY SELECTION CIRCUIT WITH INCREASING PRIORITY LEVELS FOR NON-SELECTED REQUESTED DEVICES

BACKGROUND OF THE INVENTION

1. Field of the Invention

The present invention relates to a priority selection circuit, and more particularly to a priority selection circuit to be used for interruption acceptance circuits, bus arbitration circuits and others.

2. Description of the Prior Art

Figure 8:
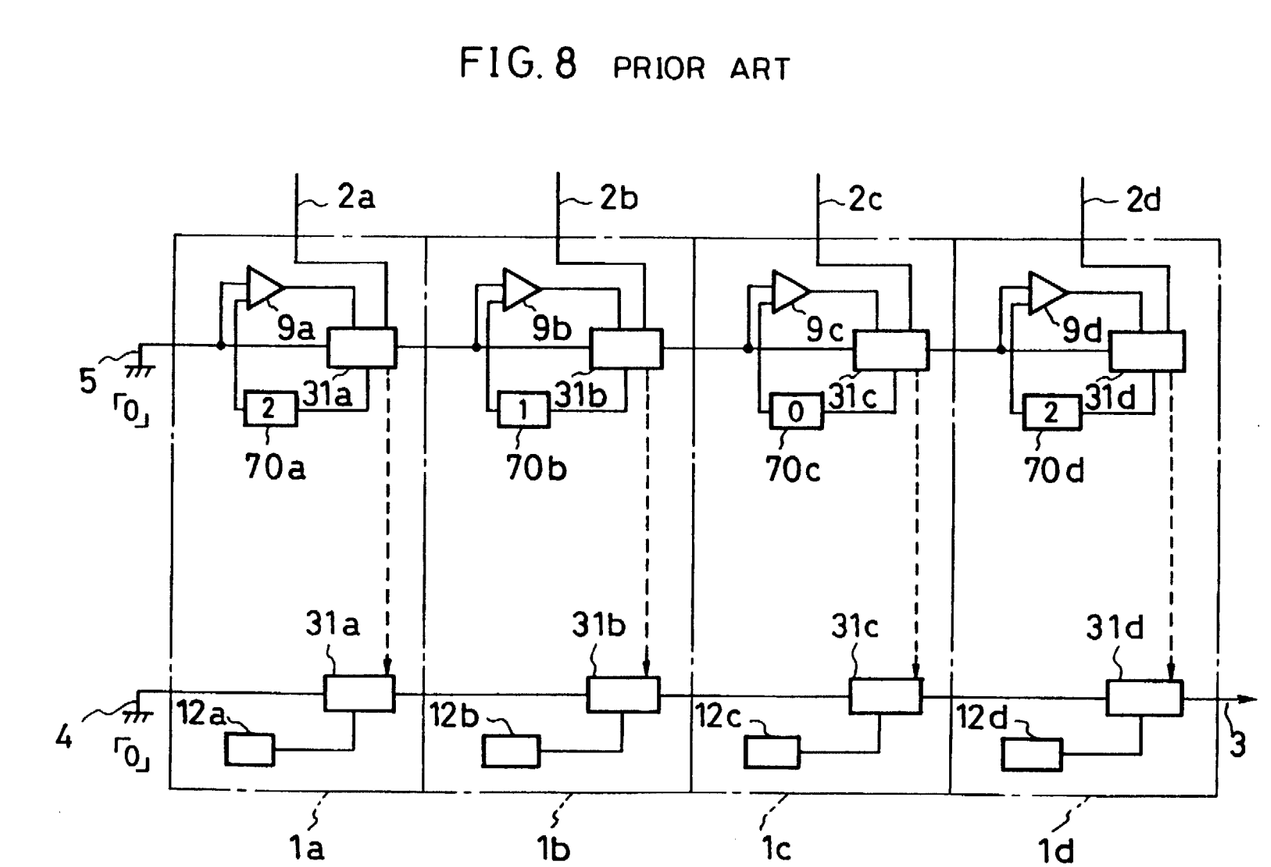
FIG. 8 shows an arrangement of a priority selection circuit according to a conventional technique.
Figure 9:
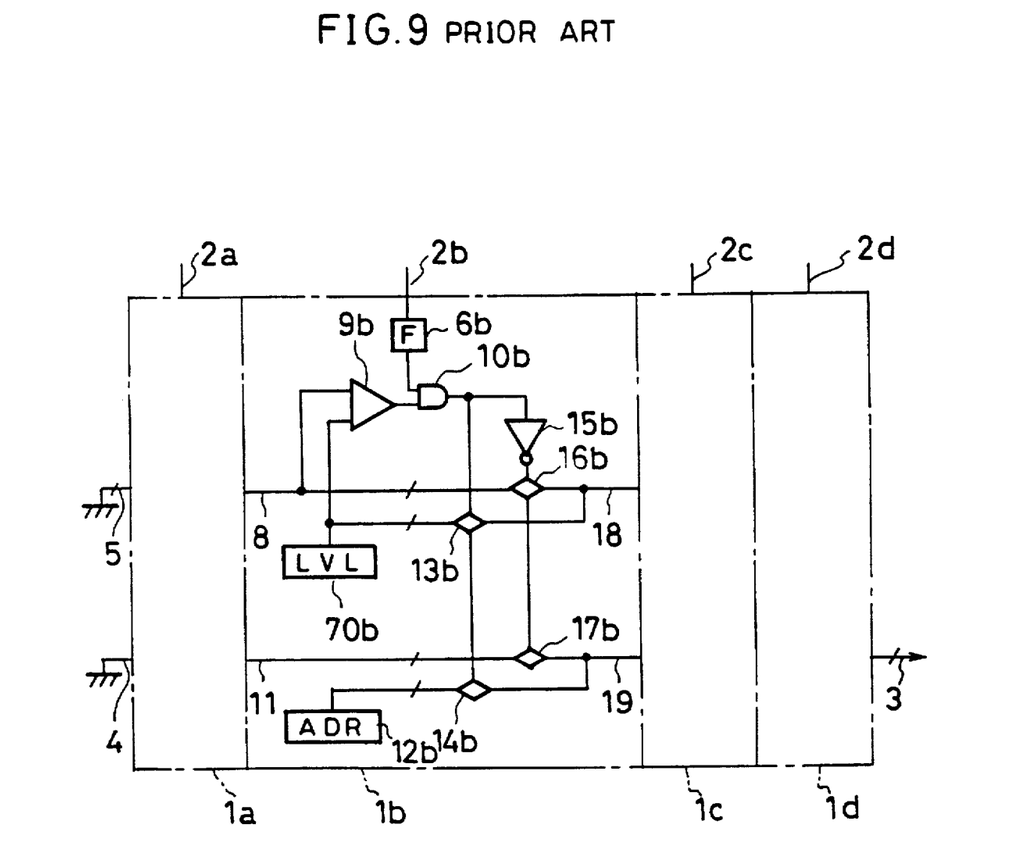
FIG. 9 is a circuit block diagram showing the FIG. 8 circuit in detail.

FIG. 8 shows an arrangement of a priority selection circuit generally used for conventional interruption acceptance circuits and others and FIG. 9 is a circuit diagram showing the priority selection circuit in detail. In FIG. 8, blocks 1a to 1d are circuits having the same arrangement and same function, 2a to 2d respectively represent service request input terminals which input service requests for devices different from each other, and 3 designates an output terminal for outputting an address value indicative of one of devices such as input/output devices (not shown) corresponding to (connecting with) the circuits 1a to 1d. Further, numeral 4 denotes an input terminal for inputting the initial value of the address value indicative of the aforementioned device, which input terminal is grounded to input "the address value "0" indicating that all the aforementioned devices do not request the services. Numeral 5 depicts an input terminal for inputting the initial value of a priority level, which input terminal is connected to a ground connection to input the lowest priority level value "0" (although in FIG. 9 the input terminals 4, 5 and the output terminal 3 are indicated by one line, in practice a plurality of lines are provided because the priority level is pluralized). Moreover, 9a to 9d are comparators for comparison in the priority, i.e., the priority level value, of the aforementioned device with each of the corresponding circuits 1a to 1d. References 12a to 12d designate constant registers for storing the address values of the corresponding devices, and 70a to 70d denote registers for storing the priority levels thereof. Further, 31a to 31d are switching circuits for selecting the greatest value of the priority level values of the circuits 1a to 1d. The device corresponding to the circuits 1a to 1d having the greatest priority level value becomes the device having the highest priority. FIG. 9 shows the switching circuits 31a to 31d in detail where only the circuit arrangement of the circuit 1b is illustrated because the circuits 1a to 1d have the same arrangement and the same function.

In FIG. 9, 6b represents a flag (F) which takes a logic "1" signal when a service request is inputted from the service request input terminal 2b. The register 70b is a register (LVL) in which the priority level of the device connected to the service request input terminal 2b is written as described above. Numeral 8 designates an input terminal for the priority level value from the circuit 1a. One input of the comparator 9b is coupled to the output of the register 70b and the other input thereof is coupled to the input terminal 8 so that the comparator 9b outputs a logic "1" signal when the value of the output of the 70b is greater than the value of the input terminal 8. Further, 10b denotes an AND gate whose one input is connected to the output of the flag (F) 6b and whose other input is connected to the output of the comparator 9b. The AND gate 10b outputs a logical product of these two input signals. Numeral 11 depicts an input terminal for the address value indicative of the device from the circuit 1d. The address value corresponding to the device connected to the service request input terminal 2b is always read out from the constant register 12b. References 13b and 14b are transfer gates which are energized when the AND gate 10b outputs the logic "1". The input of the transfer gate 13b is coupled to the output of the register 70b and the input of the transfer gate 14b is coupled to the output of the constant register 12b. Reference 15b represents a NOT gate whose input is coupled to the output of the AND gate 10b. Further, 16b and 17b are transfer gates energized when the NOT gate 15b outputs the logic "1". The input of the transfer gate 16b is connected to the input terminal 8 and the input of the transfer gate 17b is connected to the input terminal 11. Numeral 18 is an output terminal for the priority level value of the circuit 1b to the circuit 1c which output terminal is coupled to the outputs of the transfer gate 13b and the transfer gate 16b. Moreover, numeral 19 is an output terminal for the device address value of the circuit 1b to the circuit 1c which output terminal is connected to the outputs of the transfer gates 14b and 17b.

Secondly, a description will be made hereinbelow with reference to FIGS. 8 and 9 in terms of the operation of the conventional priority selection circuit. The description of the entire circuit will first be made with reference to FIG. 8 and the detailed description will subsequently be made with reference to FIG. 9. Let it be assumed that the priority level values corresponding to the respective devices are written in the circuits 1a to 1d, for example, the value "2" is written in the register 70a of the circuit 1a, the value "1" is written in the register 70b, the value "0" is written in the register 70c of the circuit 1c and the value "2" is written in the register 70d of the circuit 1d (these values are shown in the register indicating blocks in FIG. 8). Further, let it be assumed that the address values different from each other and indicative of the respective devices corresponding to the circuits 1a to 1d are always read out from the constant registers 12a to 12d of the circuits 1a to 1d. In response to inputs of the service requests for the devices connected to the service request input terminals 2a, 2b and 2d, in the circuit 1a, the initial value "0" of the priority level inputted from the input terminal 5 and the priority level value "2" written in the register 70a of the circuit 1a are compared with each other in the comparator 9a. In this case, since the priority level value written in the register 70a is greater and the service request is made from the service request input terminal 2a, in the circuit 1a the priority level value "2" and the address value indicative of the device connected to the service request input terminal 2a are outputted through the switching circuit 31a to the circuit 1b. In the circuit 1b, the priority level value "2" supplied is compared with the priority level value "1" of the register 70b. In this case, since the priority level value from the circuit 1a is greater, irrespective of the service request to the service request input terminal 2b, the circuit 1b directly outputs the supplied priority level value "2" and the address value indicative of the device connected to the service request input terminal 2a. In the circuit 1c, since the service request is not made with respect to the service request input terminal 2c, regardless of the comparison in the priority level, the priority level value "2" supplied from the circuit 1b and the address value indicative of the device connected to the service request input terminal 2a are directly outputted to the circuit 1d. In the circuit 1d, the priority level value "2" supplied and the priority level value "2" written in the register 70d of the circuit 1d are compared with each other in the comparator 9d. In this case, since the priority level value "2" supplied from the circuit 1c is equal to the priority level value "2" of the register 70d, regardless of the service request to the service request input terminal 2d, in the circuit 1d the supplied address value indicative of the device connected to the service request input terminal 2a is directly outputted from the output terminal 3. With the aforementioned operation, the conventional priority selection circuit selects, of the service-requested devices, the device having the highest priority level, i.e., the device having the greatest priority level value, or the device having the same value.

Further, the operation of the circuit 1b will be described hereinbelow with reference to FIG. 9 in terms of the case the circuit 1b is responsive to the priority level value "2" from the circuit 1a to output this value "2" to the circuit 1c as described above. In response to input of the service request from the service request input terminal 2b, the flag 6b is set to output the logic "1", whereby one input of the AND gate 10b becomes the logic "1". On the other hand, the comparator 9b always compares the priority level value "0" outputted from the register 70b with the priority level value "2" inputted from the input terminal 8. Only in the case that the priority level value of the register 70b is greater than the priority level value inputted from the input terminal 8, the comparator 9b outputs the logic "1". Since the output of the comparator 9b is the other input of the AND gate 10b, the output of the AND gate 10b becomes the logic "1" only in the case that the service request is inputted from the service request input terminal 2b and the priority level value of the register 70b is higher than the priority level value from the input terminal 8. In the other cases, that is, in the case of no service request, and in the case that, although the service request is made, the priority level value of the register 70b is equal to the priority level value from the input terminal 8 or lower than the priority level value therefrom, the logic "0" is outputted. Thus, in this case, the comparator 9b outputs the logic "0". In the case that the output of the AND gate 10b is the logic "1", the output of the NOT gate 15b becomes the logic "0", and in the case that the output of the AND gate 10b is the logic "0", the output of the NOT gate 15b becomes "1". Further, in the case that the output of the AND gate 10b is the logic "1", the transfer gates 13 and 14 takes the energized state, and in the case that the output of the AND gate 10b is the logic "0", the transfer gates 16 and 17 takes the energized state.

As described above, in the circuit 1b, the logic "0" signal is outputted from the comparator 9b so that the output of the AND gate becomes the logic "0" and inverted by the NOT gate 15b before outputted. As a result, the transfer gates 16b and 17b take the energized states and the transfer gates 13b and 14b take the OFF states, and the priority level value "2" from the circuit 1a and the address value indicative of the device corresponding to the circuit 1a are outputted to the circuit 1c. Accordingly, only in the case that the service request is inputted and the priority level value of the register 70b is higher than the priority level value from the input terminal 8, the priority level value of the register 70b is outputted through the output terminal 18 and the device address value of the constant register 12b is outputted through the output terminal 19. In the other cases, the priority level from the input terminal 8 is outputted through the output terminal 18 and the address value from the input terminal 11 is outputted through the output terminal 19.

Since the conventional priority selection circuit is arranged as described above, in the case that, for example, the service requests for the devices having high priority levels are successively inputted, there is a problem that difficulty is encountered to accept the service requests for the devices having low priority levels because of accepting only the service requests for the devices having the high priority levels.

SUMMARY OF THE INVENTION

The present invention has been developed in order to remove the above-mentioned problem, and it is therefore an object of this invention to provide a priority selection circuit which is capable of accepting the service requests for the low priority devices with the passage of time even if successively inputting the service requests for the high priority devices.

Figure 1:
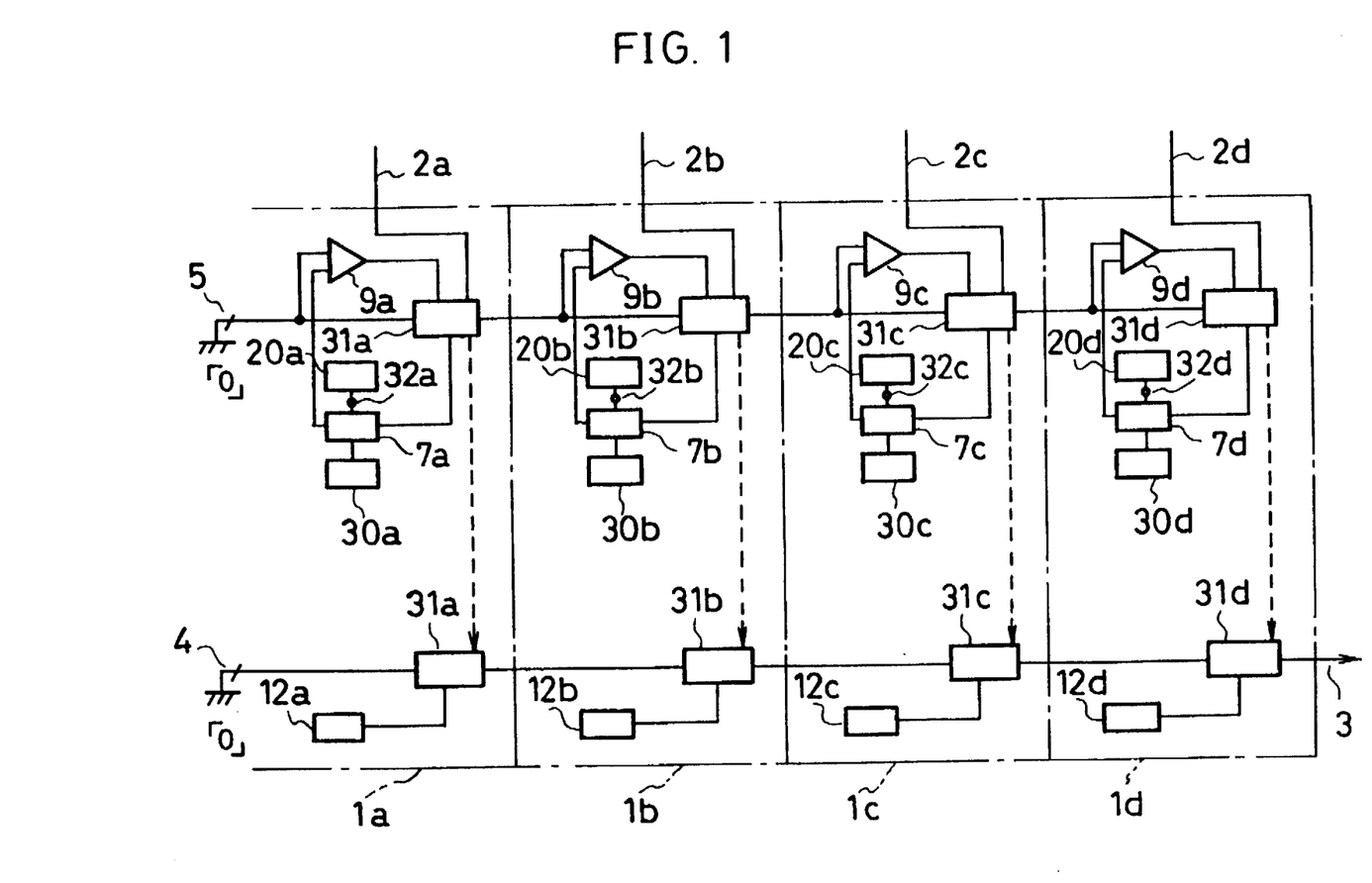
FIG. 1 shows an arrangement of a priority selection circuit according to an embodiment of this invention.

As shown in FIG. 1, in a priority selection circuit according to this invention equipped with at least first storage means (initial value registers 20a to 20d) for storing priority levels indicative of the priorities of a plurality of devices in selection circuits (circuits 1a to 1d) respectively corresponding to the plurality of devices and comparison circuits (comparators 9a to 9d) for comparing the priority level values of the own devices receiving selection requests with the priority level values of the other devices to successively inform the next selection circuits of the high priority devices so as to select the highest priority device of the devices which receive the selection requests, there are further provided addition means 30a to 30d for increasing (raising) the priority level by addition of a constant value to the initial priority level value, stored in the first storage means of the own device, whenever the own device is not selected as the high priority device, second storage means (priority level registers 7a to 7d) for storing the addition result due to the addition means as the present priority level value of the own device to be compared in the comparison means, and initial value setting means 32a to 32d for setting as the initial value of the priority level of the second storage means the non-added priority level value of the own device, stored in the first storage means, when the own device is selected as the high priority device.

Figure 2:
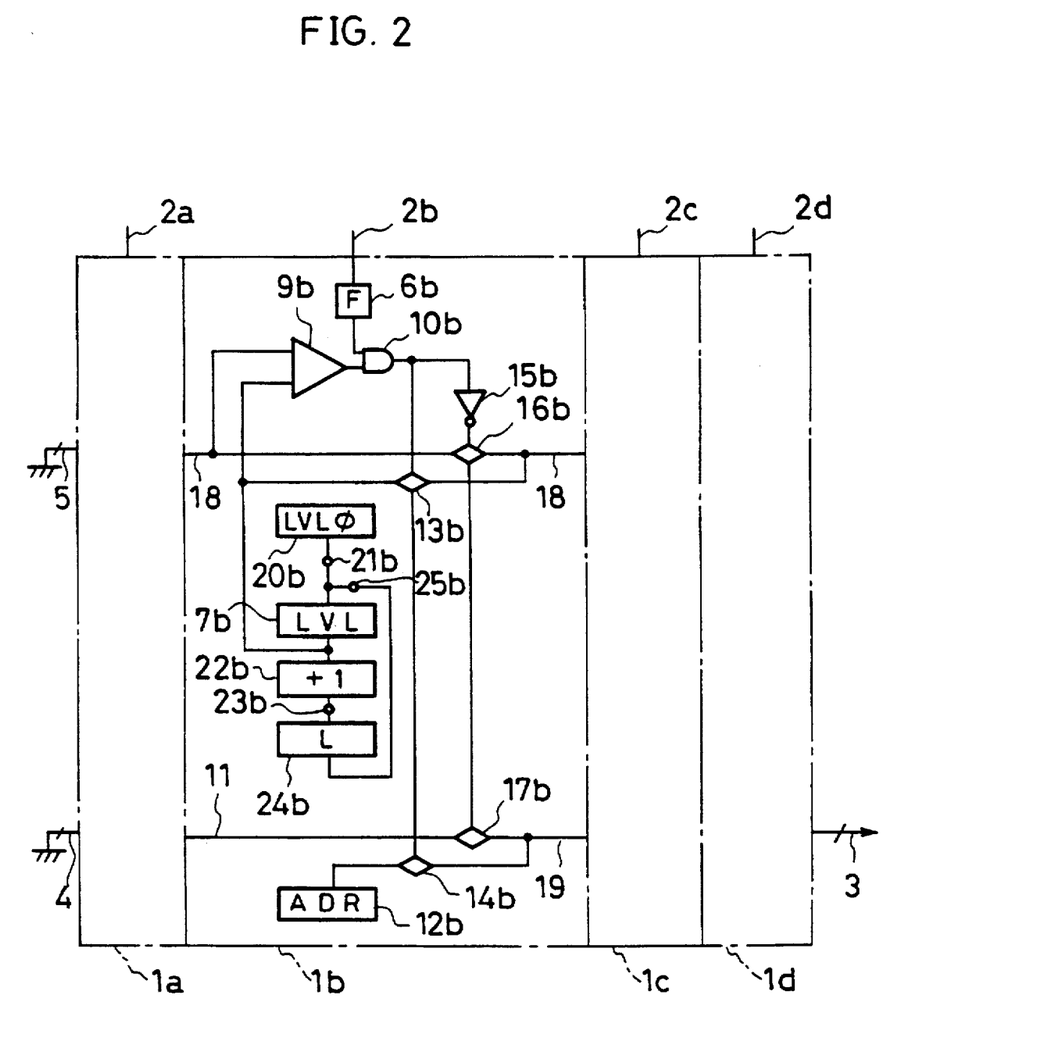
FIG. 2 is a circuit block diagram showing the FIG. 1 circuit in detail.

Further, as illustrated in FIG. 2, in the aforementioned priority selection circuit, the above-mentioned addition means comprises an adder 22b, latch 24b for temporarily holding the addition result of the adder, and a switching circuit (electric switch 23b, 25b and others) for controlling the latch and the data of the adder, and the above-mentioned initial value setting means comprises a second switching circuit (electric switch 21b and others).

Still further, in the priority selection circuit, when one of the plurality of devices receives the service request and the own device is selected as the high priority device, the above-mentioned second switching circuit is ON-controlled.

Figure 4:
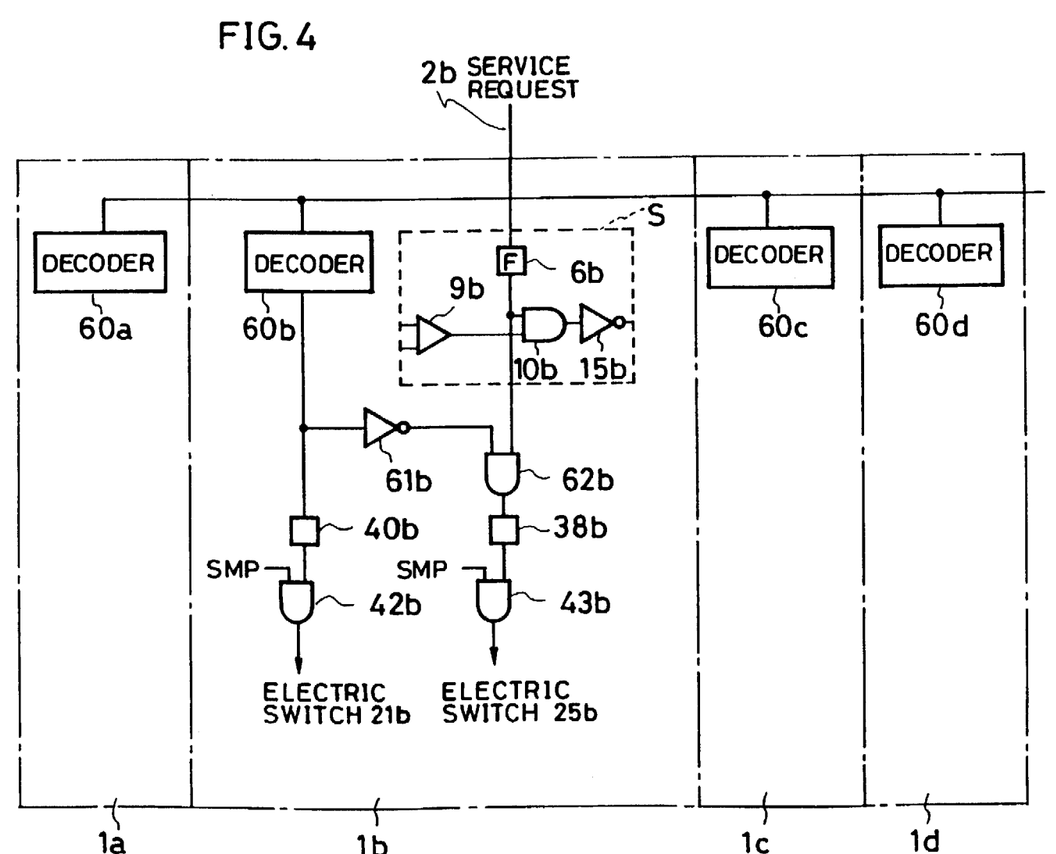
FIG. 4 is a circuit diagram showing another example of the electric switch control section of the FIG. 2 circuit in detail.

Moreover, as shown in FIG. 4, in the priority selection circuit, when one of the plurality of devices is selected as the high priority device, the above-mentioned second switching circuit is controlled in accordance with the device indicating address value from the selection circuit corresponding to the selected device.

In the priority selection circuit according to this invention, when the service request for the devices occurs, the service request is inputted to the selection circuits (circuits 1a to 1d) corresponding to the devices. The selection circuits receiving the service request supplies the priority level values, initially stored in the first storage means (initial value registers 20a to 20d), to the second storage means (priority level registers 7a to 7d) so that in the comparison circuits (comparators 9a to 9d) the values are compared with the priority level values successively supplied from the other selection circuits. Further, in the case that the priority level values of the second storage means are greater than the priority level values from the other selection circuits, the priority level values of the second storage means are outputted to the next selection circuits. On the other hand, in the case that the priority level values of the second storage means are smaller than the priority level values from the other selection circuits, the priority level values supplied from the other selection circuits are outputted to the next selection circuits. As a result, the device corresponding to the selection circuit having the highest priority level value is selected as the highest priority device. In the second storage means of the selected selection circuits, the priority level values of the first storage means are initialized by the initial value setting means 32a to 32d. Further, in the second storage means of the non-selected selection circuits, a constant value is added by the addition means 30a to 30d at every no selection, thereby increasing the priority level values. Thus, the priority level of the non-selected device is increased so as to remove the state that the service request for the low priority level device cannot be accepted permanently.

Further, in the priority selection circuit according to this invention, the addition in the addition section is effected by controlling the first switching circuit (electric switches 23b, 25b and others) by the utilization of the adder 22b and latch 24b. The initial setting to the second storage means due to the switch switching circuit (electric switch 21b and others) of the initial value setting means is effected by the second switching circuit which is energized when selected.

Still further, in the priority selection circuit according to this invention, as the signal to control the second switching circuit there is used a signal which turns it ON when one of the plurality of devices receives the service request and the own device is selected as the high priority device.

Moreover, in the priority selection circuit according to this invention, when one of the plurality of devices is selected as the high priority device, as the signal to control the second switching circuit there is used an device indicating address value from the selection circuit corresponding to the selected device.

The above and other objects, features, and advantages of the Invention will become more apparent from the following description when taken in conjunction with the accompanying drawings.

DESCRIPTION OF THE PREFERRED EMBODIMENT

An embodiment of the present invention will be described hereinbelow with reference to the drawings. FIG. 1 shows an arrangement of a priority selection circuit according to the embodiment of this invention. In FIG. 1, 1a to 1d are circuits having the same arrangement and the same function and 2a to 2d represent service request input terminals for the circuits 1a to 1d. Numeral 3 designates an output terminal for outputting an address value indicative of one of different devices corresponding thereto (although in FIG. 1 it is indicated by one line, it is actually composed of a plurality of lines to indicate one the plurality of devices). Numeral 4 denotes an input terminal for inputting the initial values of the address values indicative of these devices, the input terminal being grounded to input the address value "0" indicating that no service request occurs with respect to all the devices. Numeral 5 depicts an input terminal for inputting the initial values of the priority levels, the input terminal being grounded to input the minimum priority level "0". Further, 7a to 7d are priority level registers which act as second storage means to store the present priority level values to be compared, 9a to 9d designate comparators which act as comparison circuits to compare the priority level values, 12a to 12d represent constant registers indicative of the address values corresponding to the circuits 1a to 1d, 20a to 20d denote initial value registers which act as first storage means in which the initial values of the priority levels which do not vary are stored, and 30a to 30d are addition means for additions of the values of the priority level registers 7a to 7d at every occurrence of no selection, thereby increasing the priority level values. Moreover, 31a to 31d are selection switching sections for controlling the input and output of data such as priority level values, and 32a to 32d second switching circuits which act as initial value setting means to initialize the values of the initial value registers to the priority level registers 7a to 7d. The aforementioned selection switching section and switching circuit are shown in more detail in FIG. 2. Here, parts corresponding in function to those in FIGS. 8 and 9 are indicated by the same marks.

Secondly, a more detailed description of the arrangement of the circuits 1a to 1d will be made with reference to FIG. 2. Here, since the circuits 1a to 1d have the same arrangement and same function, the description will be made only in terms of the circuit 1b and the description of the other circuits 1a, 2c and 1d is omitted. In FIG. 2, 6b designates a flag which becomes the logic "1" when the service request is inputted from the service request input terminal 2b. The priority level register 7b holds the priority level value of the device connected to the service request input terminal 2b and the initial value register 20b holds the initial value of the priority level of the device connected to the service request input terminal 2b. The output of the initial value register 20b is coupled through the electric switch 21b to one input of the priority level register 7b. Further, 22b is an adder whose input is connected to the output of the register 7b so as to output a value obtained by adding the value "1" to this input. Reference 24b represents a latch to which the output of the adder 22 is inputted through an electric switch 23b. The output of this latch 24b is coupled through an electric switch 25b to the other input of the priority level register 7b. Moreover, numeral 8 designates an input terminal for the priority level from the circuit 1a, 9b denotes a comparator whose one input is coupled to the output of the priority level register 7b and whose other input is coupled to the input terminal 8. The comparator 9b outputs the logic "1" when the output of the priority level register 7b is higher than the input from the input terminal 8. Reference 10b depicts an AND gate whose one input is coupled to the output of the flag 6b and whose other input is coupled to the output of the comparator 9b. The AND gate 10b outputs the logical product of these two inputs.

Still further, numeral 11 represents an input terminal for the address value of the device from the circuit 1d, 12b designates a constant register from which the address value corresponding to the device connected to the service request input terminal 2b is always read out, and 13b and 14b depict transfer gates which are energized when the AND gate 10b outputs the logic "1". The input of the transfer gate 13b is connected to the output of the priority level register 7b and the input of the transfer gate 14b is connected to the output of the constant register 12b. Reference 15b is a NOT gate whose input is coupled to the output of the AND gate 10b, 16b and 17b denote transfer gates energized when the NOT gate 15b outputs the logic "1". The transfer gate 17b is connected to the input terminal 11. Further, numeral 18 is an output terminal for the priority level of the circuit 1b to the circuit 1c which output terminal is connected to the output of the transfer gate 13b and the output of the transfer gate 16b, and 19 is an output for the address value from the circuit 1b to the circuit 1c whose output terminal is connected to the output of the transfer gate 14b and the output of the transfer gate 17b. The electric switch 21b and a control circuit in FIG. 3 or 4 constitute the second switching circuit. Further, the electric switches 23b, 25b, the control circuit in FIG. 3 or 4, the adder 22b and the latch 24b constitute the first switching circuit.

Figure 3:
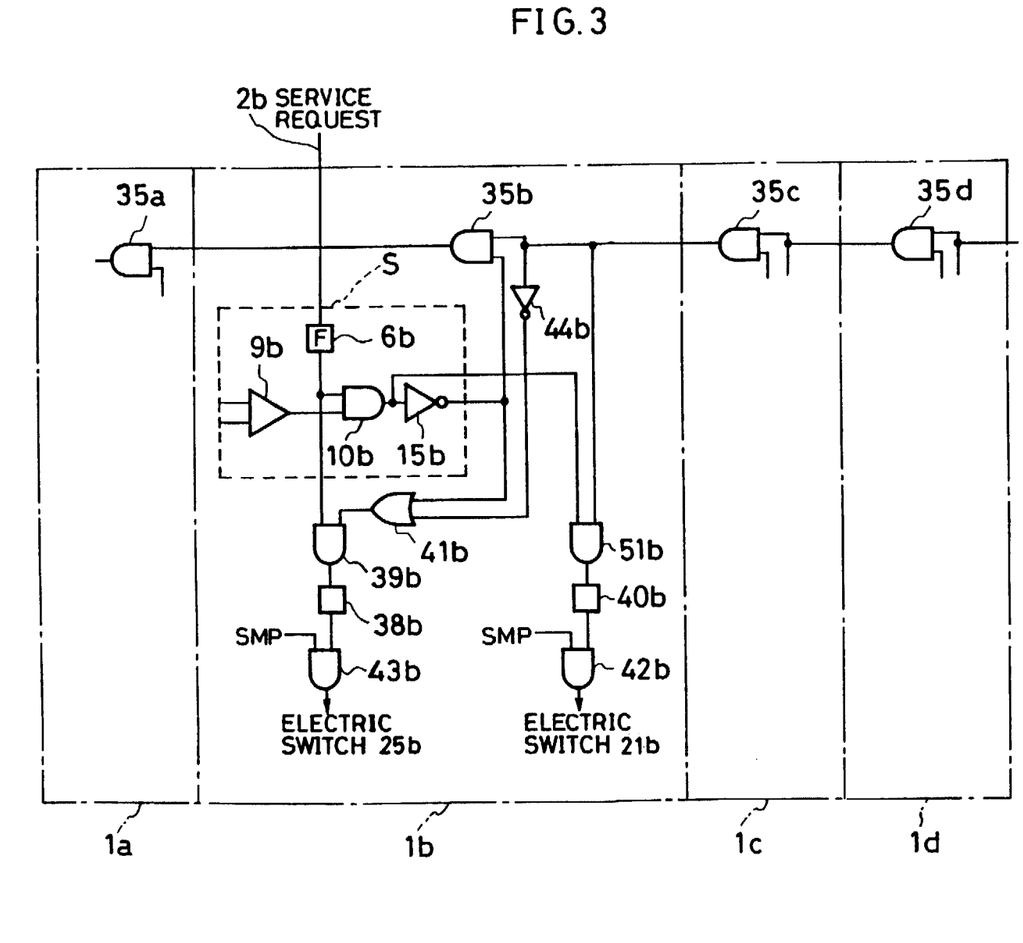
FIG. 3 is a circuit diagram showing one example of an electric switch control section of the FIG. 2 circuit in detail.
Figure 5:
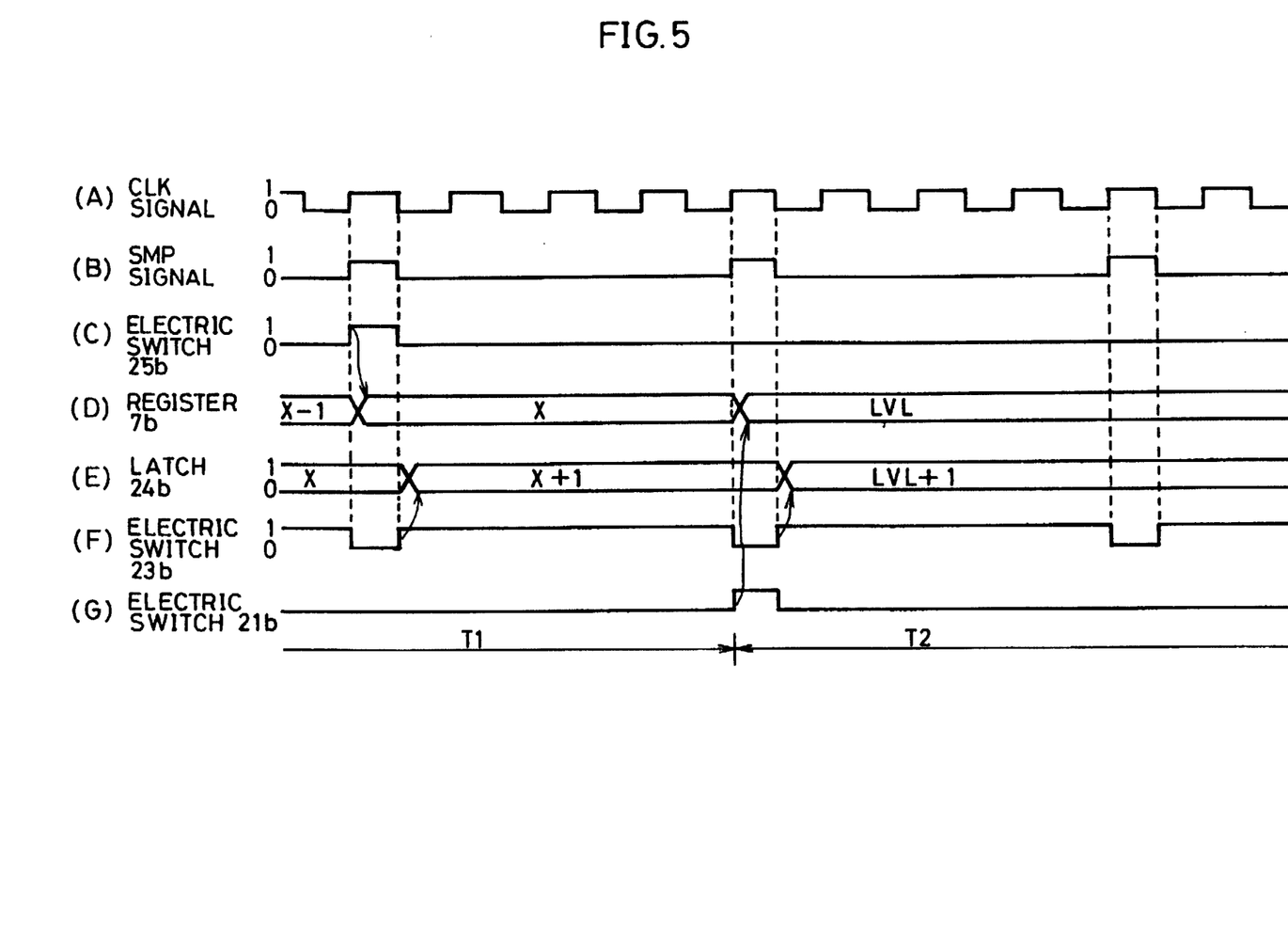
FIG. 5 is timing chart showing waveforms at portions of the FIG. 2 circuit.

FIG. 3 is a circuit diagram showing a switch control circuit for controlling an electric switch of the circuit 1b in the priority circuit according to this embodiment. In FIG. 3, S represents the electric switch section in FIG. 2 which comprises a flag 6b, a comparator 9b, an AND gate 10b and a NOT gate 15b. Further, 35a to 35d, 39b, 42b, 43b and 51b are AND gates, 38b, 40b designate latches, 41b represents an OR gate, and 44b denotes a NOT gate. The output of the NOT gate 15b is coupled to one input of the AND gate 35b and further to one input of the OR gate 41b, and the output of the AND gate 10b is coupled to one input of the AND gate 51b, and the output of the latch 6b is coupled to the input of the AND gate 39b. The electric switches 21b, 23b and 25b in FIG. 2 are energized by the FIG. 3 control circuit at the timings indicated in FIG. 5. In FIG. 5, (A) represents a clock (CLK) signal, (B) depicts a sampling (SMP) signal, (C) indicates an energizing timing of the electric switch 25b, (D) denotes timings of the input and output of the register 7b, (E) represents the timings of the data latch of the latch 24b, (F) designates the energizing timings of the electric switch 23b, and (G) is the energizing timings of the electric switch 21b.

A brief description will be made in terms of an operation of the FIG. 3 switch control circuit. Initially, let it be assumed that "2" data is set to the circuit 1a and "1" data is set to the circuit 1b. A signal which becomes "1" when a service request is accepted is one of the inputs to AND gate 35d. Accordingly, all the outputs of the AND gates 35a to 35d become "1", one input of the AND gate 51b becomes "1", and one input of the OR gate 41b becomes "0" by the NOT gate 44b. On the other hand, the service request "1" is latched in the flag 6b at the timing that the sampling (SMP) signal (FIG. 5) becomes "1". Here, the data "2" from the circuit 1a and the data "1" of the own circuit 1b are compared with each other in the comparator 9b. As a result, the output of the AND gate 10b becomes "0" and the output of the NOT gate 37b becomes "1", and the output of the AND gate 51b becomes "0" and the output of the AND gate 39b becomes "1". These outputs of the AND gates 51b and 39b are latched in the latches 38b and 40b at the timing that the sampling (SMP) signal becomes "0". The data similarly latched at the timing of the sampling (SMP) signal are outputted. As a result, the output of the AND gate 42b becomes "0" and the output of the AND gate 43b becomes "1", and the electric switch 25b is turned ON and the electric switch 21b is turned OFF. Thus, in FIG. 2, the data "2" of the circuit 1a is preceded because of being greater, and then supplied to the circuits 2c and 2d. Furthermore, the adder 22b adds +1 to the data "1" stored in the priority level register 7b of the own circuit 1b, thereby becoming "2" to heighten the priority. The operation at this time corresponds to the time T1 in FIG. 5.

On the other hand, in the case that the data of the circuit 1a is "0" and the data of the own circuit 1b is "1", the own circuit is preceded. At this time, the operation becomes reverse, and the output of the AND gate 42b becomes "0" and the output of the AND gate 42b becomes "1", and the electric switch 25b is turned OFF and the switch 21b is turned ON. Thus, in FIG. 2, the data "1" stored in the priority level register 7b of the own circuit 1b is supplied to the circuits 1c and 1d and then the data (LVLφ) of the register 20b is stored in the priority level register 7b. The operation at this time corresponds to the time T2 in FIG. 5.

FIG. 4 is a circuit diagram showing another control circuit for controlling the electric switch of the circuit 1b in the priority circuit according to this embodiment. In FIG. 4, S represents the above-mentioned electric switch in FIG. 2, 60a to 60d are decoders, 61b designates a NOT gate, 62b depicts an AND gate. The operation of this control circuit is substantially similar to the FIG. 3 operation except that the output data (the address value of the device for which a service request is accepted) of the output terminal 3 of the circuit 1d is used as input to the decoder. That is, this output data is the highest priority data of the data of the circuits 1a to 1d, and the circuit indicated by this data becomes the preceded circuit. For example, in the case of the data of the circuit 1b, the output of the decoder 60b becomes "1" by that data. As a result, "1" data is latched in the latch 40b and "0" data is latched in the latch 38b. Further, in accordance with the timing of the sampling (SMP) signal, the output of the AND gate 42b becomes "1" and the output of the AND gate 43b becomes "0", and the electric switch 21b is turned ON and the electric switch 25b is turned OFF. Accordingly, in FIG. 2, the data "1" of the own circuit 1b stored in the priority level register 7b is supplied to the circuits 1c and 1d, and then the electric switch 21b is turned ON and the priority level register 7b is initialized. On teh other hand, in the respective circuits which are not preceded irrespective of the reception of the service request, the priorities of the priority level registers 7a to 7d of the own circuit are heightened. Thus, even if having a lower priority data, the circuit can be selected.

The outline of the operation of this embodiment will first be described with reference to FIG. 1. Let it be assumed that the priority level values corresponding to the respective devices are written in the priority level registers 7a to 7d and initial value registers 20a to 20d of the circuits 1a to 1d, for example, the value "2" is written in the priority level register 7a and initial value register 20a of the circuit 1a, the value "1" is written in the priority level register 7b and initial value register 20b, the value "0" is written in the priority level register 7c and initial value register 20c of the circuit 1c, and the value "2" is written in the priority level register 7d and initial value register 20d of the circuit 1d (these values are stated in the blocks indicating the initial value registers 20a to 20d and the priority level registers 7a to 7d). Further, as well as the conventional example, the address values which are indicative of the respective devices and which are different from each other are always read out from the constant registers 12a to 12d of the circuits 1a to 1d.

First, let it be assumed that the service requests are inputted from the devices connected to the service request input terminals 2a and 2b. In the circuit 1a, the initial value "0" of the priority level inputted from the input terminal 5 and the value "2" of the priority level written in the priority level register 7a are compared with each other in the comparator 9a. In this case, since the value of the priority level written in the priority level register 7a is higher and the service request is made from the service request input terminal 2a, the priority level value "2" and the address value indicative of the device connected to the service request input terminal 2a are outputted from the circuit 1a to the circuit 1b. In the circuit 1b, the priority level value "2" supplied from the circuit 1a and the priority level value "1" of the priority level register 7b are compared with each other in the comparator 9b. In this case, since the priority level value supplied from the circuit 1a is higher, the priority level value "2" supplied and the address value indicative of the device connected to the service request input terminal 2a are directly outputted from the circuit 1b. Here, since the circuits 1c and 1d do not receive the service requests, the above-mentioned device indicating address values supplied from the circuits 1a and 1b are directly outputted, and as a result, the address value indicative of the device connected to the service request input terminal 2a is outputted from the output terminal of the circuit 1b, whereby it is possible to accept the service request for that device. Further, let it be assumed that the service requests are again inputted from the devices connected to the service request input terminals 2a and 2b. At this time, the priority level of the priority level register 7b is increased by +1 to become the value "2". In this case, the priority level values equally becomes "2", and hence, as well as the last time, it is possible to accept the service request for the device connected to the service request input terminal 2a. Moreover, when the service requests are inputted from the devices connected to the service request input terminals 2a and 2b, since at this time the priority level value of the priority level register 7b is "3", unlike the previous time the service request for the device connected to the service request input terminal 2b is accepted. As described above, since the the priority level value is increased in the case of no acceptance of the service request, the low priority device can be selected in due time.

Figure 6:
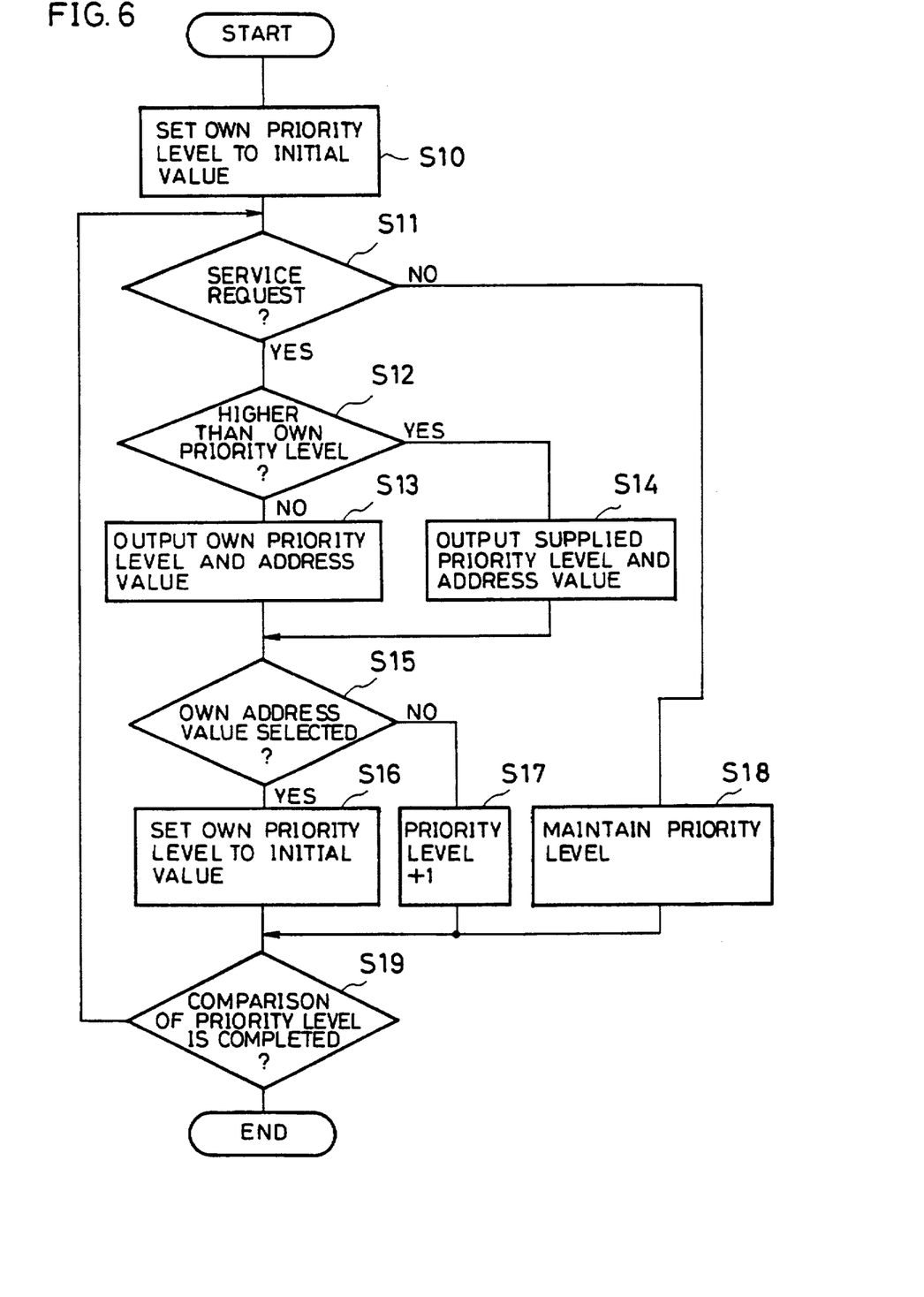
FIG. 6 is a flow chart showing an operation of the FIG. 2 circuit.

A detailed description will be made hereinbelow with reference to FIGS. 2 and 6 in terms of the operation. First, let it be assumed that, as described above, in the FIG. 2 circuit 1b, the service request is inputted to the service request input terminal 2b, and the value "2" is inputted to the input terminal 8 and the address value of the device connected to the service request input terminal 2a is inputted to the input terminal 11. The priority level value "1" of the initial value register 20b is set as the initial value in the priority level register 7b (step S10 in FIG. 6). Then, it is checked whether or not the service request from the device is inputted to the service request input terminal 2b (step S11). In this case, since there is a service request, the flag 6b outputs the logic "1". As a result, one input of the AND gate 10b is set to the logic "1" and waits for the signal from the comparator 9b. If there is no service request (NO in step S11), the priority level value is kept as it is and all the processes are terminated when all the comparisons of the priority levels are completed (step S18, S19). That is, since the flag 6b is the logic "0", the output of the AND gate 10b becomes the logic "0", and although the transfer gates 13b and 14b take the non-energized states, the transfer gates 16b and 17b are energized with the logic "6" being inverted by the NOT gate 15b to become the logic "1". Thus, the service request value and address value from the input terminals 8 and 11 are inputted through the output terminals 18 and 19 to the subsequent circuit 1c.

Further, if the service request exists (YES in step S11), the comparator 9b compares the priority level value "2" supplied from the input terminal 8 with the initial value "1" of the own priority level of the priority level register 7b (step S12). In this case, since the the priority level value "2" supplied therefrom is greater than the own priority level value "1" (YES in step S12), the circuit ib outputs the supplied priority level value and address value to the next-stage circuit 1c. On the other hand, in the case that the own priority level value is greater than the supplied priority level value, the circuit 1b outputs the own priority level value and the address value to the next-stage circuit 1d (NO in step S12, step S13). In this case, in the circuit 1b, the comparator 9b compares the priority level value "2" from the input terminal 8 with the initial value "1" of the priority level register 7b. Since the value "2" is greater than the initial value "1", the logic "0" is outputted and the output of the AND gate 10b becomes the logic "0", so that the transfer gates 13b and 14b take the non-energized states and the transfer gates 16b and 17b take the energized states. Thus, the service request value and device address value from the input terminals 8 and 11 are inputted through the output terminals 18 and 19 to the subsequent circuit 1c. If the priority level value of the own priority level register 7b is greater than the priority level value from the input terminal 8, the output of the comparator 9b becomes the logic "1" and the output of the AND gate becomes the logic "1", whereby the transfer gates 13b and 14b take the energized states and the transfer gates 16b and 17b take the non-energized states so that the circuit 1b outputs the priority level value of the priority level register 7b and the device address of the constant register 12b to the next-stage circuit 1c.

Further, it is checked whether the own device address is selected or not (step S15). In this case, since the own address value is not selected (NO in step S15), the priority level value is increased by 1 and the value "1" of the priority level register 7b is set to the value "2". On the other hand, in the case that the device address value (stored in the constant register 12b) is selected, the initial value of the priority level of the initial value register 20b is set in the priority level register 7b and the priority level value increased by the addition is restored to the original value. In this case, the priority level value is increased by +1 in the adder 22b and this addition result is returned through the electric switch 23b, the latch 24b and the electric switch 25b to the priority level register 7b. At this time, while the electric switch 25b is in the energized state, the electric switch 23b takes the non-energized state in order to prevent the lacing. These electric switch timings are according to the FIG. 5 time chart shown. Further, in the case that the own device address value is selected, the electric switch 21b is energized so that the value of the initial value register is set in the priority level register 7b.

Figure 7:
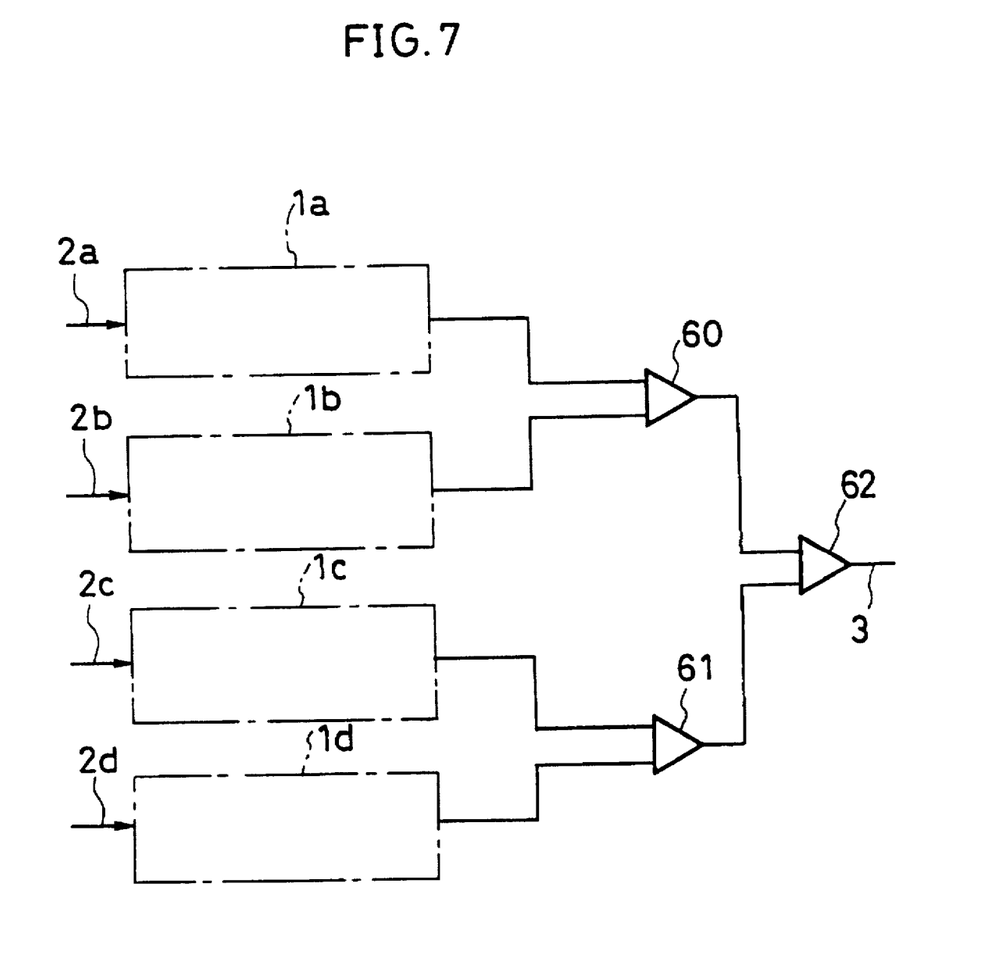
FIG. 7 shows an arrangement of a priority selection circuit in an application example of the FIG. 1 embodiment.

As seen from the above description, since the priority level value of the low priority device which is not selected is increased by the addition, it is possible to surely select the low priority device. Here, although in this embodiment the circuits 1a to 1d are connected in series to each other and the priority levels are successively compared with each other, it is appropriate that they are connected in parallel to each other as shown in FIG. 7. In FIG. 7, numerals 60, 61 and 62 are comparators for comparison between the priority levels. Further, although in the above-described embodiment the circuits 1a to 1d have the same arrangement, it is also possible that the circuit in the conventional example is incorporated thereinto.

As described above, according to this invention, in the case of not selected as the high priority device so that the service request is unacceptable, the priority level value is arranged to raised. Thus, it is possible to prevent the situation that the low priority device is not selected permanently.

What is claimed is:

1. A priority selection circuit comprising:

first storage registers for storing priority level values indicative of the priorities of a plurality of devices, for which service requests can be made, in selection circuits respectively corresponding to the plurality of devices;

comparison circuits for comparing the priority level values of the devices receiving selection requests with the priority level values of the other devices to successively inform the next selection circuits of the high priority devices so as to select the highest priority device of the devices which receive the selection requests;

addition circuits for increasing the priority levels by adding a constant value to an initial priority level value, stored in said first storage registers, of only the devices for which service requests are made and which are not selected as the high priority device;

second storage registers for storing the addition results of said addition circuits as the present priority level values of the devices to be compared in said comparison circuits; and initial value setting circuits for setting non-added priority level values stored in said first storage registers as the initial values of the priority levels of said second storage registers of the devices selected as the high priority devices, when the devices are selected as the high priority devices.

2. The priority selection circuit as recited in claim 1, wherein said addition circuit comprises an adder, a latch for temporarily holding the addition result of said adder, and a first switching circuit for controlling data of said adder and said latch, and said initial value setting circuit comprises a second switching circuit.

3. The priority selection circuit as recited in claim 2, wherein, when one of said plurality of devices for which service request is made and said one device is selected as the high priority device, said second switching circuit corresponding to said one device is ON-controlled.

4. The priority selection circuit as recited in claim 2, wherein, when one of said plurality of devices is selected as the high priority device, said second switching circuit is controlled in accordance with an address value from the selection circuit corresponding to the selected device.

5. A priority selection circuit comprising:

a plurality of selection circuits, each selection circuit corresponding to one of a plurality of devices for which service requests can be made, said plurality of selection circuits selecting a highest priority device for which a service request is made; and wherein each of said plurality of selection circuits comprises:

a) a selection switching circuit including a service request input for receiving a service request for a corresponding device, a first priority level input for receiving an incoming priority level value, a second priority level input, a comparison result input, a first address input for receiving an incoming address value, a second address input, a priority level output, and an address output;

b) a priority level register including a priority level register input and a priority level register output, said priority level register storing a present priority level value, and said priority level register output coupled to said second priority level input;

c) a comparator including a first comparator input for receiving the incoming priority level value, a second comparator input coupled to said priority level register output, and a comparator output coupled to said comparison result input;

d) a first electric switch;

e) an initial value register including an initial value register output, said initial value register storing an initial priority level value, and said initial value register output coupled through said first electric switch to said priority level register input, wherein said first electric switch operates to set the initial priority level value stored in said initial value register as a non-added present priority level value stored in said priority level register when the corresponding device is selected as the highest priority device;

f) an addition circuit including an addition input coupled to said priority level register output, and an addition output coupled to said priority level register input, wherein said addition circuit adds a constant value to the present priority level value stored in said priority level register whenever both a service request for the corresponding device is asserted at said service request input and the corresponding device is not selected as the highest priority device;

g) an address register including an address register output coupled to said second address input, said address register storing an address value indicating the corresponding device; and wherein said selection circuit outputs the incoming priority level value to said priority level output and also outputs the incoming address value to said address output whenever said incoming priority level value is higher than the present priority level value, and wherein said selection circuit outputs the present priority level value and also outputs the address value whenever both a service request is made for the corresponding device and the incoming priority level value is less than the present priority level value, and wherein said priority level output and address output of said selection circuit provide the next selection circuit with an incoming priority level value and an incoming address value.

6. The priority selection circuit as recited in claim 5, wherein said addition circuit further comprises an adder, a second electrical switch, a latch coupled through said second electrical switch to said adder, a third electrical switch, and wherein said latch is coupled through said third electrical switch to said priority level register input.

7. The priority selection circuit as recited in claim 6, further comprising control circuits for controlling the switching in said selection circuits.

8. The priority selection circuit as recited in claim 6, wherein, when one of said plurality of devices is selected as the high priority device, said control circuits are controlled in accordance with an address value from a selection circuit corresponding to said one device.

9. The priority selection circuit as recited in claim 5 wherein said selection circuits are coupled in series and the priority levels are successively compared with each other.

10. The priority selection circuit as recited in claim 5 wherein said selection circuits are coupled in parallel with comparators for comparison between the priority levels.

11. A priority selection circuit comprising:

- a plurality of selection circuits, each section circuit corresponding to one of a plurality of devices from which service request signals can be output and having a service request signal input for inputting a service request signal transmitted from a corresponding device, to a device address value register for holding a device address value of said device, and to a device priority level value register for holding a priority level value of said device; and

- wherein when the service request signal is received from the corresponding device, the device address value register of the selection circuit holding the highest priority level value in said device priority level value register outputs its stored device address value to the plurality of selection circuits; and

- wherein when the device address value register cannot output the device address value held therein upon receipt of said service request signal, addition means is provided in each of said plurality of selection circuits or any optional selection circuits to increase the priority level value held in said device priority level value register.

12. A priority selection circuit comprising:

- a plurality of selection circuits, each selection circuit corresponding to one of a plurality of devices from which service request signals can be output and having a service request signal input for inputting the service request signal transmitted from a corresponding device, to a device address value register for holding the device address value of said device, and to a device priority level value register for holding the priority level value of said device;

- each selection circuit being coupled to form a file by two lines, one of which is a device address value output line in which the output of each device address value register of said each selection circuit is coupled in parallel and the other of which is a device priority level value output line in which the output of the device priority level value register of said each selection circuit is coupled in parallel and provided in parallel with said device address value output line;

- a comparator provided in each of said plurality of selection circuits for comparing a first priority level value output to the device priority level value output line with a second priority level value held in the device priority level value register of each selection circuit, when the service request signal is received from the corresponding device, thereby outputting the device address value held in the device address value register of each selection circuit to the next selection circuit through said device address value output line whenever said second priority level value is higher than said first priority level value; and

- wherein addition means and switching means are provided in each of said plurality of selection circuits or any optional circuits, said addition means being coupled to the output of said device priority level value register, while said switching means being arranged to output the device priority level value held in said device priority level value register to said addition means and output the device priority level value added by said addition means to said comparator, by operating said switching means when the device address value held in the device address value register cannot be output upon receipt of said service request signal.

* * * * *